MAGNETIC CONTROL DEVICE HAVING SUPERCONDUCTIVE GATES

Filed March 31, 1958

Inventor
Albert E. Slade
by Roberts, Cushman & Grover
Attys

United States Patent Office 3,091,702
Patented May 28, 1963

3,091,702
MAGNETIC CONTROL DEVICE HAVING SUPERCONDUCTIVE GATES

Albert E. Slade, Cochituate, Mass., assignor to Arthur D. Little, Inc., Cambridge, Mass., a corporation of Massachusetts Filed Mar. 31, 1958, Ser. No. 725,048
4 Claims. (Cl. 307—88.5)

This application constitutes a continuation-in-part of my copending application Ser. No. 636,944, filed January 29, 1957, now abandoned.

This invention relates to a device for controlling magnetic flux and particularly to a superconductive device acting as a magnetic flux gate.

Various superconductive materials are known which are capable of a change of state from one of finite electrical resistance to one of zero resistance. For example, lead cooled to 7.2 degrees Kelvin suddenly drops to zero resistance. The temperature at which superconductive materials undergo such transition is dependent on the magnetic field about the material. The critical temperature of 7.2° K. for lead supposes a zero magnetic field. As the field increases toward approximately 800 oersteds the transition temperature drops toward zero. Thus for any given temperature there is a predetermined value of magnetic field above which lead undergoes transition from the superconducting state, and the change between superconduction and finite resistance can be effected by varying the magnetic field respectively below and above the predetermined value.

A further characteristic of superconductive materials has been discovered which involves the inability of magnetic flux or lines of force to be established or varied within the compass of a superconductive body in superconducting state. Magnetic flux may exist in superconductive bodies while in the state of finite resistance. Thus superconductive bodies may also be said to have a flux-supporting and a flux-nonsupporting state, by which it is meant that a body in flux-nonsupporting state will prevent the establishment or variation in the number of lines of force within its compass, although established lines of force may persist.

According to the invention a magnetic control device comprises a body of superconductive material capable of change between a flux-supporting and a flux-nonsupporting state, means for directing to a first part of said body a magnetic flux capable of acting at a second part of said body, means at said second part actuated by flux acting at said second part, and means for applying to said body a magnetic field to change said body from flux-nonsupporting to flux-supporting state thereby to control operation of said actuated means by said directing means. By first and second parts of the superconductive body it is meant to include two sides or positions located such that the body encompasses or encircles the path between the two parts. That is the body may be solid between the two parts which define the ends of the flux path through the body, in which case there is a gap between the flux directing and actuated means; or the body may be open between the two parts, in which case there may or may not be a gap between the flux directing and actuated means; but in either case the body extends outside and entirely around the direct flux path between the first and second parts. If the body is open, i.e. there is an air path through the body, the flux directing and flux actuated means may be continuous through the opening. However, the body will still be capable of controlling operation of the actuated means by the flux directing means.

For the purpose of illustration typical embodiments of the invention are shown in the accompanying drawings in which FIG. 1 is a plot of transition temperature against magnetic field applied to several superconductive elements;

Figure 1:
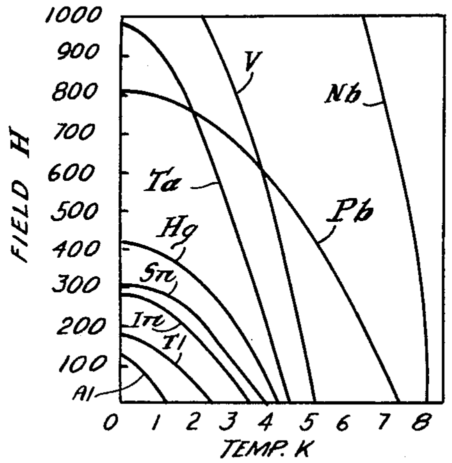

As shown in FIG. 1 various elements are capable of superconduction, depending upon the temperature and magnetic field of their environment. In this figure are shown the transition curves of aluminum (Al), thallium (Tl), indium (In), tin (Sn), mercury (Hg), tantalum (Ta), vanadium (V), lead (Pb) and niobium (Nb). For each of these elements the curve is a plot of the transition temperature as a function of the applied magnetic field. Below the curve the element is superconducting, and above the curve the element has a finite resistance usually less than the resistance at room temperature.

Figure 2:
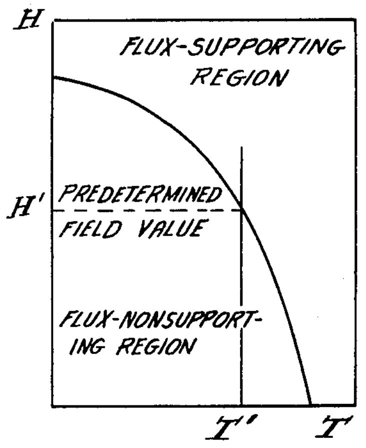
FIG. 2 is a similar plot showing transition between flux-supporting and nonsupporting states of a superconductive body.

As shown in FIG. 2 the transition curve is also the boundary between the flux-supporting region and the flux-nonsupporting region of a given element. For a given temperature environment T′ there is a predetermined magnetic field value H′ below which the element is in flux-nonsupporting state. If the magnetic field is increased above this predetermined field value the element will become flux-supporting.

Figure 3:
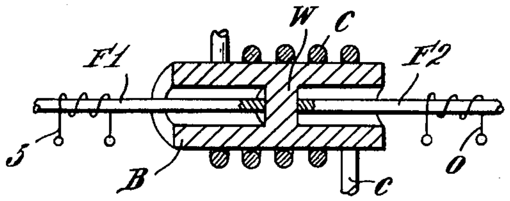
FIG. 3 is a section view of a magnetic control device.

Shown in FIG. 3 is a magnetic control device embodying a tubular body B of superconductive material, which may be any of the elements shown in the plot of FIG. 1 or various other alloys and compounds which are superconductive below various temperatures The tubular body has a transverse wall W disposed in a space between two iron rods F1 and F2, each of which are capable of supporting magnetic flux in the operating range of the superconductive body B. An input winding S is coiled around the rod F1 and an output winding O is coiled about the rod F2. A control winding C is coiled around the tubular body B. Preferably the control winding C is formed of a superconductive material having higher transition values than the body B, so that as the body B is operated in the range adjacent its transition curve the control winding C remains in superconducting state. For example if a lead (Pb) body B is used the control wire may be niobium (Nb). If a control current is supplied to coil C, destroying superconduction and establishing flux-supporting state, and if then a current is applied to the input winding S, a magnetic flux is developed in the rod F1 which will penetrate the wall W of the superconductive body B to the second rod F2 so long as the body B is not superconducting. If the applied current is varying, flux in the second rod F2 will in turn then induce a signal in the output winding O. However, if a current is removed from the control winding C thereby reducing the field applied to the superconductive body B below the predetermined value of magnetic field for the operating temperature, then the body B becomes superconducting and flux variations cannot penetrate the wall W. Accordingly no signal is induced in the output winding O. Thus the body B acts as a gating device for magnetic flux.

Figure 4:
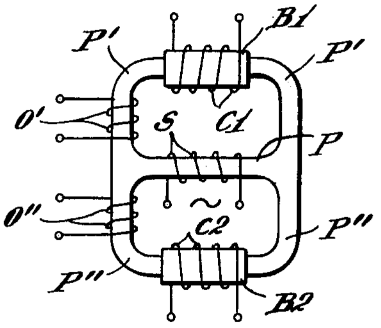
FIG. 4 is a view of a magnetic switching circuit.

As shown in FIG. 4 the control device B, C may be used for magnetic switching between alternate flux paths of a magnetic circuit. The circuit comprises a main path P and branch paths P′ and P″ of flux conducting material. An input winding is coiled around the main path P. Each of the branch paths has a gap bridged by superconductive flux gate B1 or B2 like the body B of FIG. 3, the paths having output windings O′ or O″ respectively. The flux gates B1 and B2 respectively are controlled by coils C1 and C2, which, like the control coil C of FIG. 3, are capable of changing the respective gate bodies from flux-nonsupporting to flux-supporting state when current is supplied.

With a varying current applied to the input coil S, and with current supplied only to control coil C1 thereby making gate body B1 flux-supporting, substantially all the flux produces in the main path P will act in branch path P′ rather than in branch path P″ whose gate is in flux-nonsupporting state. Thus current will be induced primarily only in the output coil O′.

If current to coil C1 is cut off, and current is applied to control coil C2, gate B1 will be restored to flux-nonsupporting state and gate B2 will become flux-supporting, so that current will cease to be induced in output coil O′, and will appear at output coil O″.

While two sets of gates, control and ouput coils are shown, a similar magnetic switching action will result if only one set is used. For example, if gate B2 and coils C2 and O″ are omitted, the gap in branch path P″ permanently closed, changing gate B1 between states would result in a substantial change in the output coil O′.

Figure 5:
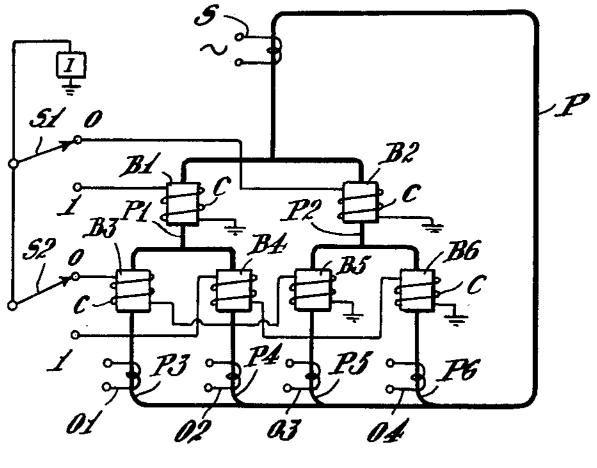
FIG. 5 is a schematic diagram of a switching circuit utilizing magnetic control devices.

The control devices of FIGS. 3 and 4 have a practical application in switching circuit such as shown in FIG. 5. In this schematic figure the heavy black lines represent material such as iron which supports magnetic flux in the operating regions of the superconductive body. The iron flux conductor forms a main path P and branch paths P1 to P6. A varying current is applied to an input winding S which tends to establish magnetic flux in the main and branch paths. In each branch there is a gap filled by one of the flux gates B1 to B6 which, like the superconductive bodies B of FIGS. 3 and 4, have control windings C. The control windings of gates B1 and B2 are connected respectively to the O and 1 input terminals of a binary switch S1. The control windings of gates B3 and B5 are connected in series to the O terminal of a second binary switch S2. The windings of gates B4 and B6 are connected in series to the 1 input terminal of the second binary switch. A current source I is connected to each of the switches for the purpose of applying a control field above the predetermined field value of the gates B1 to B6. The respective branches P3 to P6 have output windings O1 to O4.

With the switches S1 and S2 in the position shown, gates B2, B3 and B5 are connected to the current source I and are therefore in flux-supporting states. Gates B1, B4 and B6 have no magnetic field applied thereto and therefore are superconducting and in flux-nonsupporting state which blocks flux through their respective branches. Accordingly only one flux path through branches P2 and P5 is complete, and the signal applied through the input winding S will be detected only by the output winding O3. In other combinations of positions of the binary switches S1 and S2, the output windings O1, O2 and O4, respectively will be energized.

Figure 6:
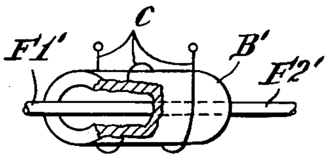
FIG. 6 is a view of another form of magnetic control device.

In FIG. 6 is shown an alternate form of magnetic control device comprising an annular superconductive body B′ forming an opening therethrough and a control coil C, like that of FIG. 3. An iron rod having two, continuous portions F1′ and F2′ extends through the opening of the annular body. One portion F1′ comprises a flux directing means and the other F2′ a flux actuated means. With current in the control coil C, flux may pass from portions F1′ to F2′ as in FIG. 3. If current in the control coil C is cut off reducing the magnetic field in the gate body B′ below the critical or predetermined value, the volume encompassed by the body, including the opening through the body becomes flux-nonsupporting as defined hereinbefore. Variations of flux in the flux directing portion F1′ will not be transferred to the flux actuated portion F2′ although the two portions are continuous, assuming, of course, that the directed flux does not exceed the critical value for the body B′. The same control is available whether or not the two portions F1′ and F2′ are continuous through the gate body opening.

From the foregoing description it can be seen that the invention involves a novel device for controlling penetration of magnetic lines of force from one part of a body to another, and that whereas there are shown operative examples of the device, the invention comprises other modifications. For example, while there is shown iron flux-conducting means, flux may be directed and detected without such conductors. Also magnetic flux may be applied and detected by magnetic materials not requiring electric current. Separate flux producing and control coils S and C are shown, but these may be combined while retaining their separate functions respectively of applying a flux sufficient to penetrate the gate body without destroying superconduction, and of applying a field raising the net field above predetermined value. In this respect it should be understood that the control field may merely add to other fields present to raise the field above predetermined value. Thus the invention contemplates all modifications and equivalents falling within the appended claims.

I claim:

1. A magnetic control device comprising magnetic flux-conducting means forming a main flux path, branch paths connected with said main path, and for each branch path at least two further branch paths connected with the first said branch paths, each of said branches having a gap therein, a body of superconductive material extending through each of said gaps, each of said bodies being capable of transition between a flux-supporting and a flux-nonsupporting state, means in said path outside said branch paths for inducing flux in said paths, means in one of said branch paths for detecting flux therethrough, and for each of said bodies input means for applying a magnetic field to the body thereby to change said body from flux-nonsupporting state, said applying means being controllable to reduce said field and allow said body to change to flux-supporting state, thereby to substantially impede flux between said inducing means and the detecting means for the same branch path as the flux-nonsupporting body.

2. A magnetic control device comprising magnetic flux-conducting means forming a flux path with at least two branches therein, a body of superconductive material embracing at least one of said branches, said body being capable of transition between a flux-supporting and a flux-nonsupporting state, means in said path for inducing flux in said path, means in one of said branches for detecting flux therethrough, and input means for applying a magnetic field to said body thereby to change said body from flux-nonsupporting state, said input means being controllable to reduce said field and allow said body to change to flux-nonsupporting state, thereby to substantially impede flux in the same branch as said body.

3. A magnetic control device comprising magnetic flux-conducting means forming a flux path with at least two branches therein, a body of superconductive material embracing each of said branches, each of said bodies being capable of transition between a flux-supporting and a flux-nonsupporting state, means in said path outside said branches for inducing flux in said path, means in one of said branches for detecting flux therethrough, and for each of said bodies input means for applying a magnetic field to the body thereby to change said body from flux-nonsupporting state, said input means being controllable to reduce said field and allow said body to change to flux-nonsupporting state, thereby to substantially impede flux between said inducing means and the detecting means for the same branch as said body.

4. A magnetic control device comprising magnetic flux-conducting means forming a main flux path, branch paths connected with said main path, and for each branch path at least two further branch paths connected with the first said branch paths, a body of superconductive material embracing each of said branches, each of said bodies being capable of transition between a flux-supporting and a flux-nonsupporting state, means in said path outside said branch paths for inducing flux in said path, means in one of said branch paths for detecting flux therethrough, and for each of said bodies input means for applying a magnetic field to the body thereby to change said body from flux-nonsupporting state, said applying means being controllable to reduce said field and allow said body to change to flux-supporting state, thereby to substantially impede flux between said inducing means and the detecting means for the same branch path as the flux-nonsupporting body.

References Cited in the file of this patent

UNITED STATES PATENTS

| | | |
|---|---|---|
| 2,666,884 | Ericsson et al. | Jan. 19, 1954 |
| 2,685,653 | Orr | Aug. 3, 1954 |
| 2,832,897 | Buck | Apr. 29, 1958 |
| 2,913,881 | Garwin | Nov. 24, 1959 |

FOREIGN PATENTS

| | | |
|---|---|---|
| 975,848 | France | Oct. 17, 1950 |

OTHER REFERENCES

"An Analysis of the Operation of a Persistent Supercurrent Memory Cell," R. L. Garwin, pp. 304–308, IBM Journal, October 1957.

"Trapped Flux Superconducting Memory," J. W. Crowe, pp. 295–303, IBM Journal, October 1957.

"The Cryotron—A Superconductive Computer Element," D. A. Buck, pp. 482–493, Proceedings of the IRE, April 1956.

"The Summing Point—How Cryotron Components and Circuitry, Can Be Used," from Automatic Control, August 1956, pp. 21–23.

Article by Faber, Proceedings of the Royal Society of London, Ser. A, vol. 214, October 1952, pages 392–395.